Sept. 22, 1953     A. PAUL, JR     2,652,810
LIVESTOCK DUSTING DEVICE
Filed July 5, 1951     2 Sheets—Sheet 1
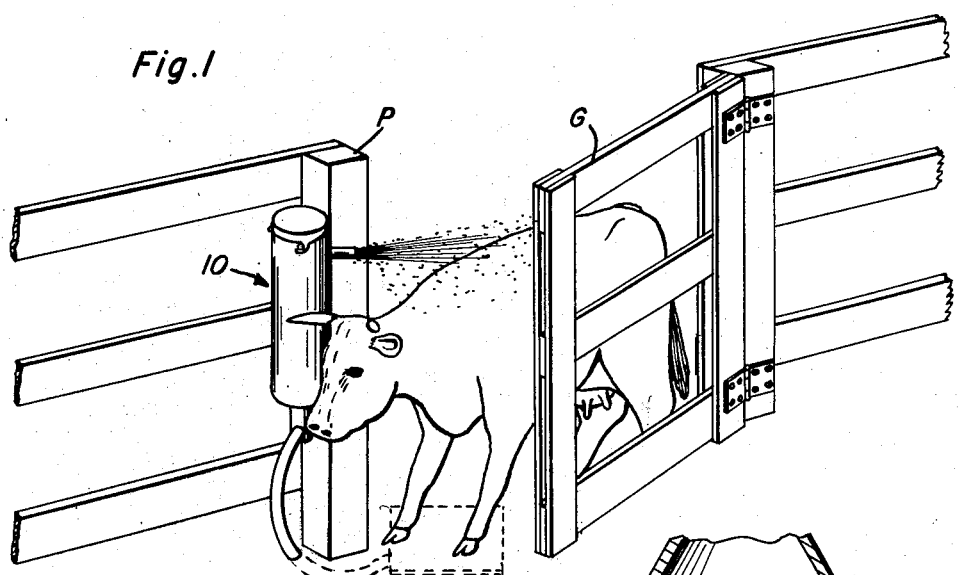
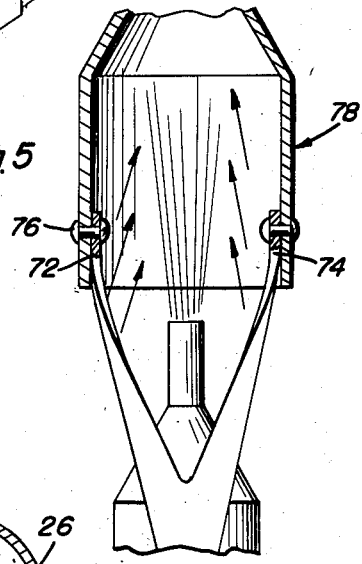
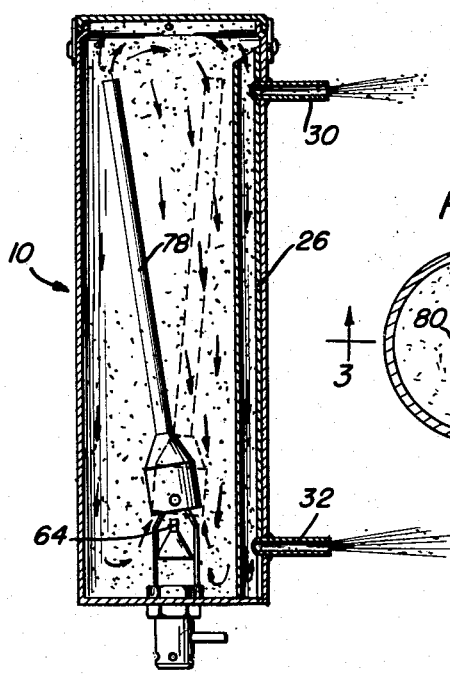
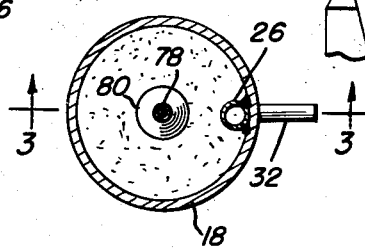
Alfred Paul, Jr.
INVENTOR.
BY

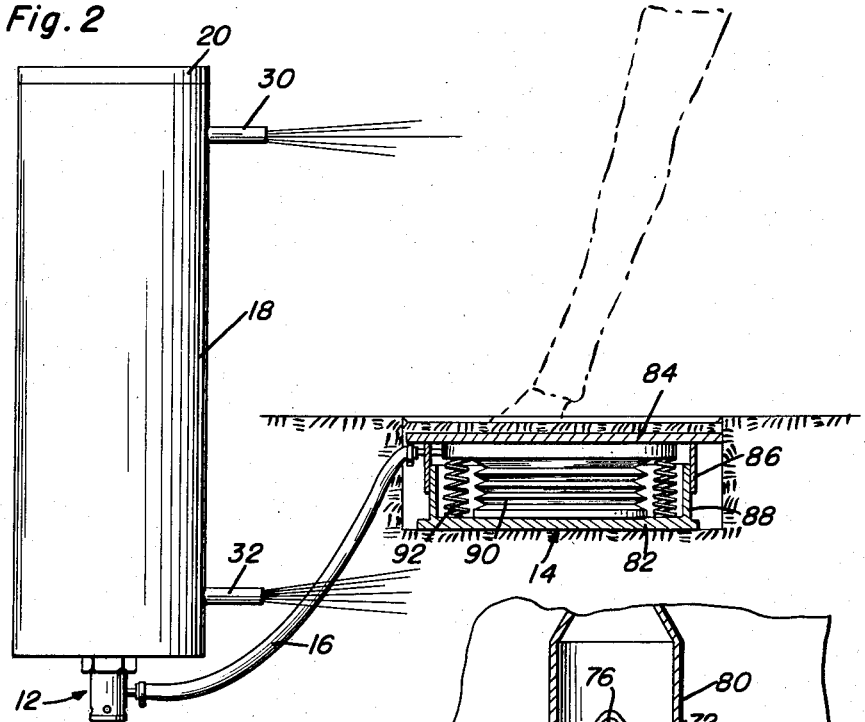
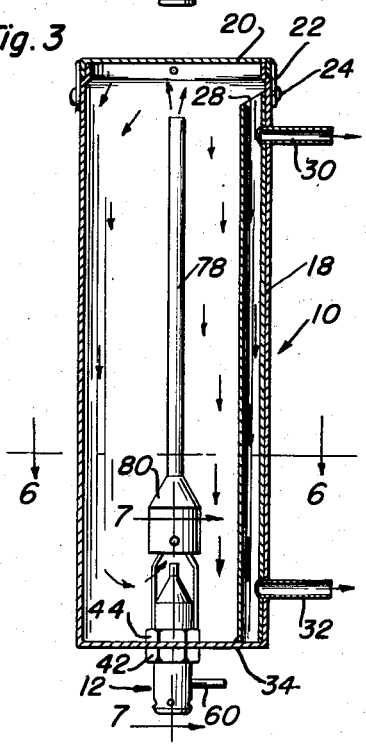
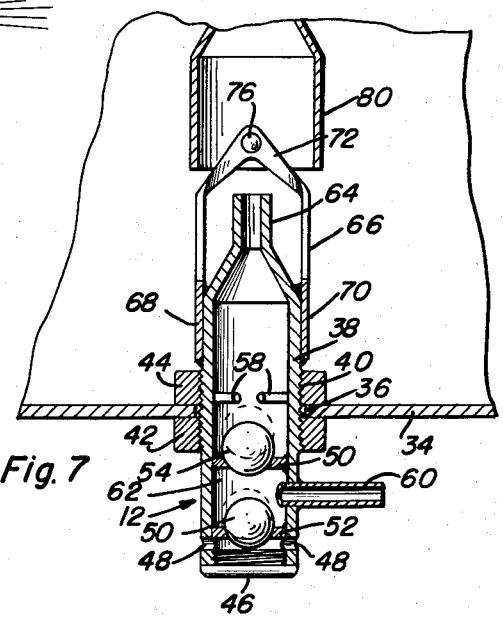
Alfred Paul, Jr.
INVENTOR.

Patented Sept. 22, 1953

2,652,810

UNITED STATES PATENT OFFICE 2,652,810

LIVESTOCK DUSTING DEVICE

Alfred Paul, Jr., Paul Spur, Ariz.

Application July 5, 1951, Serial No. 235,125

6 Claims. (Cl. 119—159)

The present invention relates to improvements in livestock dusting apparatus and more particularly to an apparatus wherein the dust container is associated with a weight actuated bellows whereby the weight of the livestock can be employed for supplying air to the dust container and forcing dust from the container against the body of the animal.

An object of the present invention resides in the provision of a livestock dusting container having sprayer outlets associated therewith, a weight actuated bellows being in communication with the interior of the dust container whereby compression of the bellows effects agitation of the dust within the container and dispensing of the agitated dust from the container against the animal.

Another object of the present invention resides in the novel construction within the dust container wherein an elogated tube is provided for pivotal adjustment relative to the outlet tube whereby the concentration of dispensed dust and air can be preadjusted.

A further object of the present invention resides in the provision of a double check valve whereby depression of the weight actuated valves effects dispensing of dust laden air from the container and expansion of the bellows effects suction of atmospheric air into the bellows for a repeat operation.

A further object of the present invention resides in the provision of an elongated tube having a funnel-like lower end adapted to overlie the inlet connection whereby injection of air from the inlet connection into the funnel-like end of the elongated tube will effect agitation and circulation of the dust within the container for dispensing dust laden air through the sprayer outlet against an animal.

Various other objects and advantages will become apparent from the detailed description to follow. The best form in which I have contemplated applying my invention is clearly illustrated in the accompanying drawings, wherein:

Figure 1 is a perspective view showing the apparatus of the present invention associated with a fence at the gate thereof whereby the animal passing through the gate actuates the bellows for effecting spraying of dust over the animal's body;

Figure 2 is a side elevational view of the dust container showing associated therewith a weight actuated bellows disposed in a hole in the ground at the gateway;

Figure 3 is a vertical transverse sectional view taken substantially along the plane of line 3—3 of Figure 6;

Figure 4 is a view similar to Figure 3 but wherein the agitating tube is shown in adjusted relation to the outlet tube;

Figure 5 is an enlarged detail view of a means for supporting the elongated agitated tube;

Figure 6 is a horizontal section view taken substantially along the plane of line 6—6 of Figure 3; and, Figure 7 is a detailed vertical sectional view taken substantialy along the plane of line 7—7 of Figure 3.

Referring more particularly to the drawings, wherein like numerals designate like parts throughout, the numeral 10 designates generally the dust container having an inlet assembly 12 at the lower end thereof and the numeral 14 designates generally the weight actuated bellows connected to the inlet assembly 12 by the conduit 16.

The dust container 10 is best shown in Figures 3 and 4 as comprising an elongated cylindrical tank 18 having a removable closure 20 associated with its upper end and locked thereon by means of the hook portions 22 and pins 24. The tank 18 has a longitudinal outlet tube 26 secured to the inner surface thereof and having an open upper end at 28 in communication with the interior of the tank 18. The tank 18 and outlet tube 26 are formed with apertures in which are disposed the sprayer outlets 30 and 32.

The bottom wall 34 of the tank 18 is formed with an opening at 36 whereby the inlet means 12 can be disposed therethrough. The inlet means 12 is comprised of an elongated tubular casing 38 externally threaded at 40 for disposition within the opening 36 of the bottom wall 34. A pair of nuts 42 and 44 are threadably engaged on the casing 38 for locking the same relative to the bottom wall 34.

The casing 38 is provided with a closure plug 46 at its bottom end with a plurality of apertures 48 formed immediately above the closure plug 46. The casing 38 is also provided with a pair of apertured valve seats 50 and 52 upon which ball check valves 54 and 56 are adapted to respectively seat. Ball retaining elements 58 are secured to the inner surface of the casing 38 above the ball checked valve 54 for limiting the upward movement of the valve 54. A tube 60 is communicated with the chamber 62 between the seats 50 and 52 and is adapted to have the conduit 16 secured thereto as shown best in Figure 2.

The upper end of the casing 38 is of reduced diameter at 64. A supporting bracket 66 has its lower ends 68 and 70 secured to opposite sides of the casing 38 while its upper ends 72 and 74 have pins 76 extending therethrough for pivotally supporting the elongated tube 78. The form of the bracket 66 is best shown in Figures 5 and 7 as being of U-shape with a split formed therein whereby the support portions 72 and 74 for the tube 78 are provided.

The elongated tube 78 has its lower end of funnel-like form at 80 adapted to overlay the reduced diameter outlet 64 of the casing 38. Figure 4 shows the elongated tube 78 in adjusted relation to the longitudinal tube 26 whereby the concentration of dust in the air dispensed can be controlled.

The weight actuated bellows 14 is best disclosed in Figure 2 and is comprising a base 82 and a top 84 telescopically engaged with the base 82 by means of the telescoping cylindrical walls 86 and 88. The interior of the bellows 90 is communicated with the conduit 16 and springs 92 normally upwardly urge the top 84.

Figure 1 shows the dust container 10 carried by the fence post T adjacent to the gate G whereby when the animal steps on the top 84 of the bellows, air will be forced through the reduced diameter outlet 64 into the funnel-like end 80 from the elongated tube 78.

Into the funnel-like end 80 of the elongated tube 78, the tube will be in preadjusted relation to the outlet tube 26, as shown in Figure 4. Thus, dust within the container 10 will circulate through the tube 78 by injection as a result of the high speed air passing from the reduced diameter outlet 64 into the funnel-like end 80. Part of the dust-laden air will pass to the outlet tube 26 and sprayer oulets 30 and 32 to the animal's body. As the animal steps off the top 84 of the bellows, the check valve 54 will become seated against the seat 50 while the check valve 56 will unseat and as a result of the suction permit air to pass from the atmosphere through the apertures 48 into the conduit 16 to the bellows for repeat operation.

Having described my invention, what is claimed as new is:

1. A livestock dusting apparatus comprising a dust container having a longitudinal outlet tube secured therein with an open upper end in communication with the interior of said container, at least one sprayer outlet secured to the exterior of said container and in communication with said outlet tube, a weight actuated bellows, an inlet connection for said container, a conduit interconnecting said bellows with said inlet connection whereby depression of said bellows by an animal forces air into said container agitating the dust therein and forcing dust into said outlet tube and out said sprayer outlet, and an elongated tube having a funnel-like end supported by said inlet connection and overlying the same whereby dust can circulate therethrough by injection of air from said inlet connection, said elongated tube being adjustable toward and away from said outlet tube to control the proportion of dust and air to be dispensed from the container.

2. A livestock dusting apparatus comprising a dust container having a longitudinal outlet tube secured therein with an open upper end in communication with the interior of said container, at least one sprayer outlet secured to the exterior of said container and in communication with said outlet tube, a weight actuated bellows, an inlet connection for said container, a conduit interconnecting said bellows with said inlet connection whereby depression of said bellows by an animal forces air into said container agitating the dust therein and forcing dust into said outlet tube and outsaid sprayer outlet, and an elongated tube having a funnel-like end supported by said inlet connection and overlying the same whereby dust can circulate therethrough by injection of air from said inlet connection, said elongated tube being pivotably adjustable toward and away from said outlet tube, to control the proportion of dust and air to be dispensed from the container.

3. A livestock dusting apparatus comprising a dust container having a longitudinal outlet tube secured therein with an open upper end in communication with the interior of said container, at least one sprayer outlet secured to the exterior of said container and in communication with said outlet tube, a weight actuated bellows, an inlet connection for said container, a conduit interconnecting said bellows with said inlet connection whereby depression of said bellows by an animal forces air into said container agitating the dust therein and forcing dust into said outlet tube and out said sprayer outlet, said inlet connection being of elongated form and having a pair of valve seats formed therein, said inlet connection forming a chamber between said valve seats, said conduit opening into the chamber between said valve seats, said inlet connection having open upper and lower ends, the open upper end opening into said container and the open lower end opening into the atmosphere, ball check valves engageable with said valve seats whereby depression of said bellows forces air past one of said check valves into said container, and expansion of said check valve effects suction of atmospheric air through said open lower end and past the other check valve to said bellows.

4. A livestock dusting apparatus comprising a dust container having a longitudinal outlet tube secured therein with an open upper end in communication with the interior of said container, at least one sprayer outlet secured to the exterior of said container and in communication with said outlet tube, a weight actuated bellows, a substantially tubular inlet connection for said container, a conduit interconnecting said bellows with said inlet connection whereby depression of said bellows by an animal forces air into said container agitating the dust therein and forcing dust into said outlet tube and out said sprayer outlet, said inlet connection having an open upper end opening into said container and having a pair of valve seats formed therein between its ends, said inlet connection forming a chamber between said valve seats said conduit opening into the chamber between said valve seats, said inlet connection having a closed lower end with apertures formed therein opening into the atmosphere, ball check valves engageable with said valve seats whereby depression of said bellows forces air past one of said check valves into said container, and expansion of said check valve effects suction of atmospheric air through said apertures and past the other check valve to said bellows, and an elongated tube having a funnel-like end supported by said inlet connection and overlying the same whereby dust can circulate therethrough by injection of air from said inlet connection.

5. A livestock dusting apparatus comprising a dust container having a longitudinal outlet tube secured therein with an open upper end in communication with the interior of said container, at least one sprayer outlet secured to the exterior of said container and in communication with said outlet tube, a weight actuated bellows, an inlet connection for said container, a conduit interconnecting said bellows with said inlet connection whereby depression of said bellows by an animal forces air into said container agitating the dust therein and forcing dust into said outlet tube and out said sprayer outlet, said inlet connection being of elongated form and having a pair of valve seats formed therein, said inlet connection forming a chamber between said valve seats said conduit opening into the chamber between said valve seats, said inlet connection having open upper and lower ends, the open upper end opening into said container and the open lower end opening into the atmosphere, ball check valves engageable with said valve seats whereby depression of said bellows forces air past one of said check valves into said container, and expansion of said check valve effects suction of atmospheric air through said open lower end and past the other check valve to said bellows, and an elongated tube having a funnel-like end supported by said inlet connection and overlying the same whereby dust can circulate therethrough by injection of air from said inlet connection, the inner end of said inlet connection being of reduced diameter for directing a high speed stream of air into the funnel-like end of said elongated tube.

6. A livestock dusting apparatus comprising a dust container having an outlet tube therein, said outlet tube having at least two openings therein, one of said openings communicating with the interior of the container and the other of said openings communicating with the exterior of the container, said container having an air inlet opening and means for supplying air under pressure through said inlet opening and means within said container for controlling the proportion of dust and air to be dispensed from the container, an elongated tube mounted in said container adjacent said air inlet to conduct air toward the outlet tube opening communicating with the interior of the container, said tube being adjustable toward and away from said outlet tube opening and constituting the means to control the proportion of dust and air.

ALFRED PAUL, Jr.

References Cited in the file of this patent

UNITED STATES PATENTS

| Number | Name | Date |
|---|---|---|
| 1,303,851 | Carlson | May 20, 1919 |
| 1,360,642 | Irwin | Nov. 30, 1920 |
| 1,438,410 | Taylor et al. | Dec. 12, 1922 |
| 2,086,696 | Brandt | July 13, 1937 |
| 2,226,013 | Oys | Dec. 24, 1940 |
| 2,569,369 | Brandt | Sept. 25, 1951 |